United States Patent
Schweizer

(10) Patent No.: US 11,306,638 B2
(45) Date of Patent: Apr. 19, 2022

(54) METHOD FOR CONTROLLING AN SCR CATALYTIC CONVERTER

(71) Applicant: Robert Bosch GmbH, Stuttgart (DE)

(72) Inventor: Frank Schweizer, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 17/128,623

(22) Filed: Dec. 21, 2020

(65) Prior Publication Data
US 2021/0189935 A1    Jun. 24, 2021

(30) Foreign Application Priority Data
Dec. 20, 2019   (DE) .................. 10 2019 220 343.4

(51) Int. Cl.
*F01N 3/20* (2006.01)

(52) U.S. Cl.
CPC ........... *F01N 3/208* (2013.01); *F01N 3/2073* (2013.01); *F01N 2560/021* (2013.01); *F01N 2560/026* (2013.01); *F01N 2610/02* (2013.01); *F01N 2900/0408* (2013.01); *F01N 2900/16* (2013.01)

(58) Field of Classification Search
CPC .... F01N 3/208; F01N 3/2073; F01N 2610/02; F01N 2900/0408; F01N 2900/16; F01N 2560/026; F01N 2560/021
See application file for complete search history.

(56) References Cited

U.S. PATENT DOCUMENTS

| | | | | |
|---|---|---|---|---|
| 2004/0211171 A1* | 10/2004 | Nakagawa | .......... | F02D 41/1465 60/285 |
| 2013/0263575 A1* | 10/2013 | Sun | .......... | F01N 11/00 60/274 |
| 2017/0130629 A1* | 5/2017 | Nagel | .......... | F01N 3/035 |
| 2017/0248059 A1* | 8/2017 | Nagel | .......... | F01N 13/009 |
| 2019/0024563 A1* | 1/2019 | Wang | .......... | F01N 11/00 |

FOREIGN PATENT DOCUMENTS

DE    102013205583 A1    10/2013
DE    102018117271 A1    1/2019

* cited by examiner

*Primary Examiner* — Phutthiwat Wongwian
*Assistant Examiner* — Diem T Tran
(74) *Attorney, Agent, or Firm* — Michael Best & Friedrich LLP

(57) ABSTRACT

A method for controlling an SCR catalytic converter (20, 30), comprising detecting (200) concentration values (314, 324; 414, 424) in the exhaust gas downstream of the catalytic converter (20), wherein at least one concentration value for $NH_3$ and one concentration value for $NO_x$ is detected; calculating (202) modeled concentration values (316, 322; 416, 422) for $NH_3$ and $NO_x$ downstream of the catalytic converter on the basis of a catalytic converter model, wherein the model comprises an aging parameter (342, 442) which at least partially describes aging of the modeled catalytic converter; comparing (208) the detected concentration values with the modeled concentration values; and, in a manner dependent on the result of the comparison, changing the aging parameter (342, 442) of the model and/or changing a predefined dosing quantity for a reducing agent in the SCR catalytic converter.

11 Claims, 4 Drawing Sheets

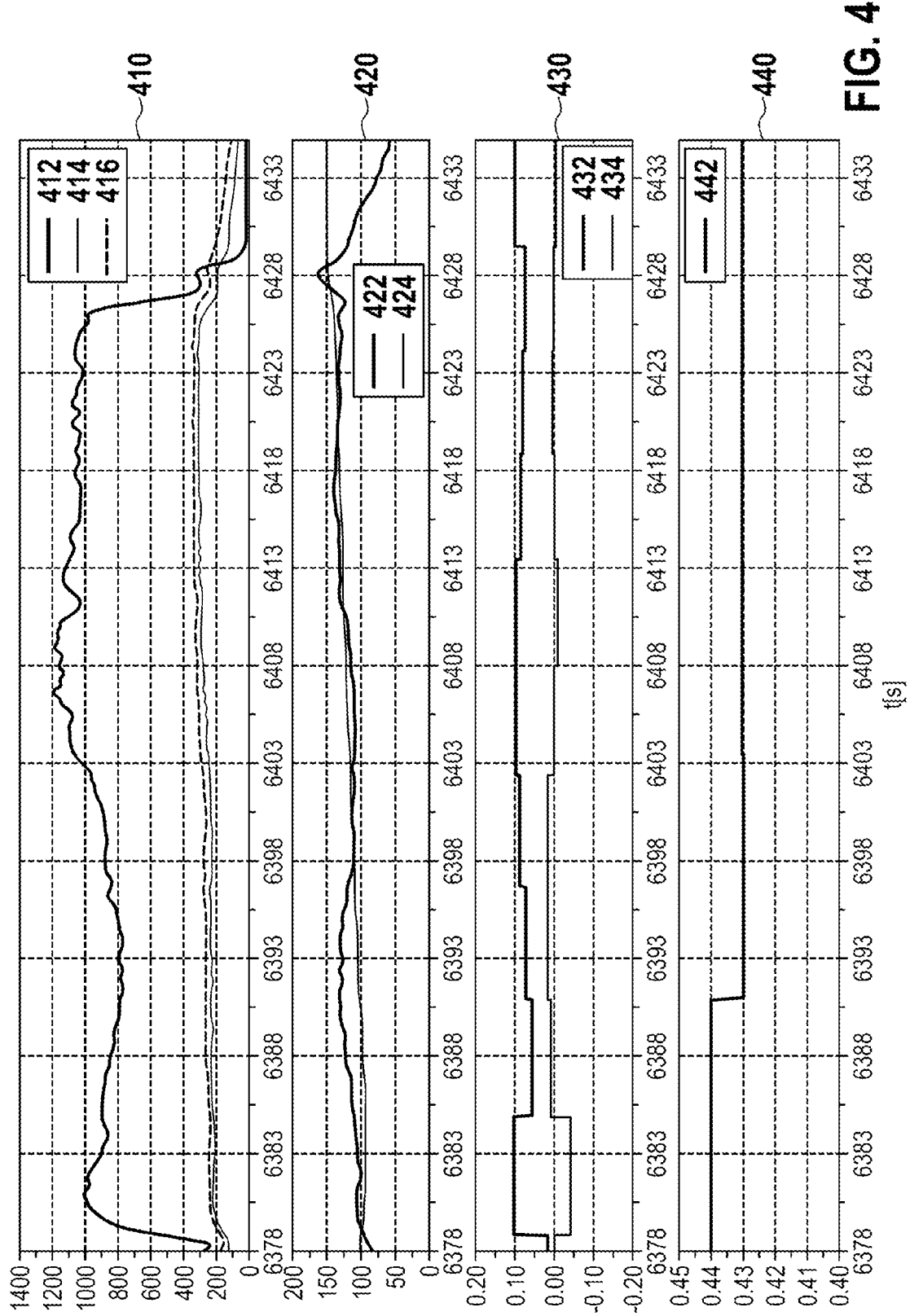

METHOD FOR CONTROLLING AN SCR CATALYTIC CONVERTER

BACKGROUND OF THE INVENTION

The present invention relates to a method for controlling an SCR catalytic converter and to a processing unit and a computer program for carrying out said method.

Various measures are known for the reduction of nitrogen oxides in the exhaust gas of internal combustion engines. In particular, use is made of catalytic converters based on the principle of selective catalytic reduction (SCR), in which the nitrogen oxides (NO, $NO_2$, summarized as $NO_x$) are normally converted with the aid of ammonia to form nitrogen ($N_2$) and water. For this purpose, an aqueous urea solution is injected into the exhaust gas in the exhaust-gas tract, from which aqueous urea solution carbon dioxide $CO_2$ and ammonia $NH_3$ are in turn formed in the presence of suitable temperatures. Instead of the urea-water solution, it is generally also conceivable for use to be made of other reducing agents that are suitable for a selective reduction in the SCR catalytic converter.

For an efficient reduction of the nitrogen oxides, in particular for compliance with ever more stringent emissions limit values for nitrogen oxides and $CO_2$, it is important for the injected quantity of the urea solution to be adapted as exactly as possible to the present nitrogen oxide emissions of the engine and to the operating conditions in the catalytic converter. In the case of insufficient dosing, the nitrogen oxides cannot be reduced with adequate efficiency, whereas, in the case of excessive dosing, excess ammonia can pass in an undesired manner into the exhaust gas downstream of the catalytic converter and thus into the ambient air, which is also referred to as ammonia slippage. As a dosing device, use may for example be made of a known dosing valve with suitable control, which is normally arranged in the region of the inlet of the catalytic converter. Other injection positions are however also conceivable, as is a combination of multiple dosing devices at various locations in the exhaust-gas aftertreatment system.

SCR catalytic converters that are known nowadays store ammonia or $NH_3$ by adsorption on the catalytic converter surface. The $NO_x$ conversion in the SCR catalytic converter is more successful the greater the reducing agent availability in the catalytic converter is. As long as the storage capacity of the SCR catalytic converter for $NH_3$ has not yet been exhausted, excess dosed reducing agent is stored. With regard to the stored $NH_3$, an $NH_3$ fill level of the catalytic converter is also referred to. If less reducing agent is available than is required for the conversion of the nitrogen oxides currently present in the exhaust gas, the stored reducing agent is consumed for the conversion of the nitrogen oxides, and the $NH_3$ fill level is thus reduced.

The efficiency of the catalytic converter is dependent on the temperature, on the spatial velocity and very crucially also on the fill level thereof. In the case of a high fill level, stored ammonia is also available in addition to the directly dosed ammonia, whereby the efficiency is increased in relation to an emptied catalytic converter. The storage behavior is in turn dependent on the respective operating temperature of the catalytic converter. The lower the temperature, the greater the storage capacity.

If the catalytic converter has completely filled its store, it is however possible for $NH_3$ slippage to occur in the event of step changes in load, even if no further reducing agent is dosed. If it is sought to attain the highest possible levels of $NO_x$ conversion, it is however essential to operate the SCR system with a high $NH_3$ fill level.

The aging of a catalytic converter is generally a function of the temperature. This means that, the higher the temperature of the SCR is, the more intense is the damage that must be assumed to occur. In the case of a combined SCR with particle filter (SCRF), the catalytic converters reach for example up to 650° C. during the regeneration phase. In the event of overloading with soot, the temperature may briefly also be considerably higher. Thus, in this case, the number and nature of the particle filter regenerations is definitive of the present aging. The aging can be taken into consideration in catalytic converter models used for control purposes, for example by way of an aging factor. The aging factor has hitherto been ascertained substantially by way of a dwell time at particular temperatures and transmitted to the catalytic converter models. Here, the actual aging of a catalytic converter may however deviate considerably from this coarse modeling. The undesired consequences are higher $NO_x$ emissions or more $NH_3$ slippage.

SUMMARY OF THE INVENTION

According to the invention, a method for controlling a catalytic converter, and also a processing unit and a computer program for carrying out said method, are proposed.

In particular, a method is proposed in which concentration values in the exhaust gas downstream of the catalytic converter are detected, wherein at least one concentration value for $NH_3$ and one concentration value for $NO_x$ are detected, and furthermore modeled concentration values for $NH_3$ and $NO_x$ downstream of the catalytic converter are calculated on the basis of a catalytic converter model. Here, the model comprises an aging parameter which at least partially describes aging of the modeled catalytic converter. The detected concentration values are compared with the modeled concentration values, and, in a manner dependent on the result of the comparison, the aging parameter of the model and/or a predefined dosing quantity for a reducing agent in the SCR catalytic converter are/is changed. If the modeled and detected values substantially correspond, the model and dosing quantity are preferably not changed. In this way, the system can adapt the aging factor in the model in continuous and automatic fashion on the basis of the measured separate values for $NH_3$ and $NO_x$, and thus keep deviations in the modeling small.

In one embodiment, the aging parameter is in this case changed if the comparison of the concentration values yields that the deviation between the detected concentration values and the modeled concentration values is both lower than a predefined first threshold value for $NH_3$ and lower than a predefined second threshold value for $NO_x$, wherein the first and the second threshold value are lower than or equal to zero, or if the comparison of the concentration values yields that the deviation between the detected concentration values and the modeled concentration values is both higher than a predefined third threshold value for $NH_3$ and higher than a predefined fourth threshold value for $NO_x$, wherein the third and the fourth threshold value are higher than or equal to zero. Thus, the aging parameter of the model is changed whenever both measurements yield that the measured signals are poorer or better than the modeled prediction.

It is optionally also possible here for one or more acceptance conditions for detected concentration values to be checked, wherein detected concentration values may for example be discarded if at least one acceptance condition for said detected concentration values is not met. Here, as acceptance conditions, use may for example be made of the following, individually or in any combination with one another: a lower and/or upper threshold value for the catalytic converter temperature, a status of a sensor for detecting concentration values, a threshold parameter for describing driving dynamics, a threshold value for a mass flow of the exhaust gas upstream of the catalytic converter, and others. It is thus ensured that only suitable operating points are utilized for the evaluation and adaptation of dosing or model.

For the aging parameter, it is for example possible for a maximum value to be predefined which corresponds to a fully functional catalytic converter, and a minimum value, which corresponds to a catalytic converter which is no longer adequately functional.

The comparison of detected and modeled concentration values may comprise integrating the concentration values over a predefined period of time and calculating a difference between the modeled and the detected integrated concentration values. Optionally, the values may also be normalized, for example in relation to the traveled distance. The predefined period of time for the integration may be determined for example in a manner dependent on a defined traveling distance, or in a manner dependent on a defined reference quantity of untreated $NO_x$ emissions through the internal combustion engine.

In one embodiment, the predefined dosing quantity for a reducing agent is furthermore reduced if the comparison of the concentration values yields that the deviation between the detected concentration values and the modeled concentration values for $NO_x$ is lower than the predefined first threshold value whereas the deviation between the detected concentration values and the modeled concentration values for $NH_3$ is higher than the predefined second threshold value, and the predefined dosing quantity for a reducing agent is increased if the comparison of the concentration values yields that the deviation between the detected concentration values and the modeled concentration values for $NO_x$ is higher than the predefined third threshold value whereas the deviation between the detected concentration values and the modeled concentration values for $NH_3$ is lower than the predefined fourth threshold value.

The ageing parameter is changed preferably in continuous fashion, for example by means of a suitable closed control loop, such as for example a closed-loop I controller. For the adaptation of the aging parameter, it is however also possible, for example, to set or predefine a step size by which the aging parameter of the model is increased or reduced if the respective conditions apply.

The concentration values in the exhaust gas downstream of the catalytic converter may preferably be detected by means of a multi-gas sensor which is capable of outputting separate signals for $NH_3$ and $NO_x$. Likewise, it is however also possible for there to be separate sensors for $NH_3$ and $NO_x$, or for a signal of one sensor to be further processed in order to obtain separate measured values for the two variables therefrom.

A processing unit according to the invention, for example a control unit of a motor vehicle, is configured, in particular in terms of programming technology, to carry out a method according to the invention.

The implementation of a method according to the invention in the form of a computer program or computer program product with program code for carrying out all of the method steps is also advantageous, because this entails particularly low costs, in particular if an executing control unit is also utilized for further tasks and is therefore present in any case.

Suitable data carriers for providing the computer program are in particular magnetic, optical and electrical memories, such as for example hard drives, flash memories, EEPROMs, DVDs and others. A download of a program via computer networks (Internet, intranet etc.) is also possible.

Further advantages and configurations of the invention will emerge from the description and from the appended drawing.

The invention is schematically illustrated on the basis of exemplary embodiments in the drawing and will be described below with reference to the drawing.

BRIEF DESCRIPTION OF THE DRAWINGS

FIG. 4 shows exemplary measured values according to an embodiment for a case in which the present aging is greater than the modeled aging.

DETAILED DESCRIPTION

Figure 1:
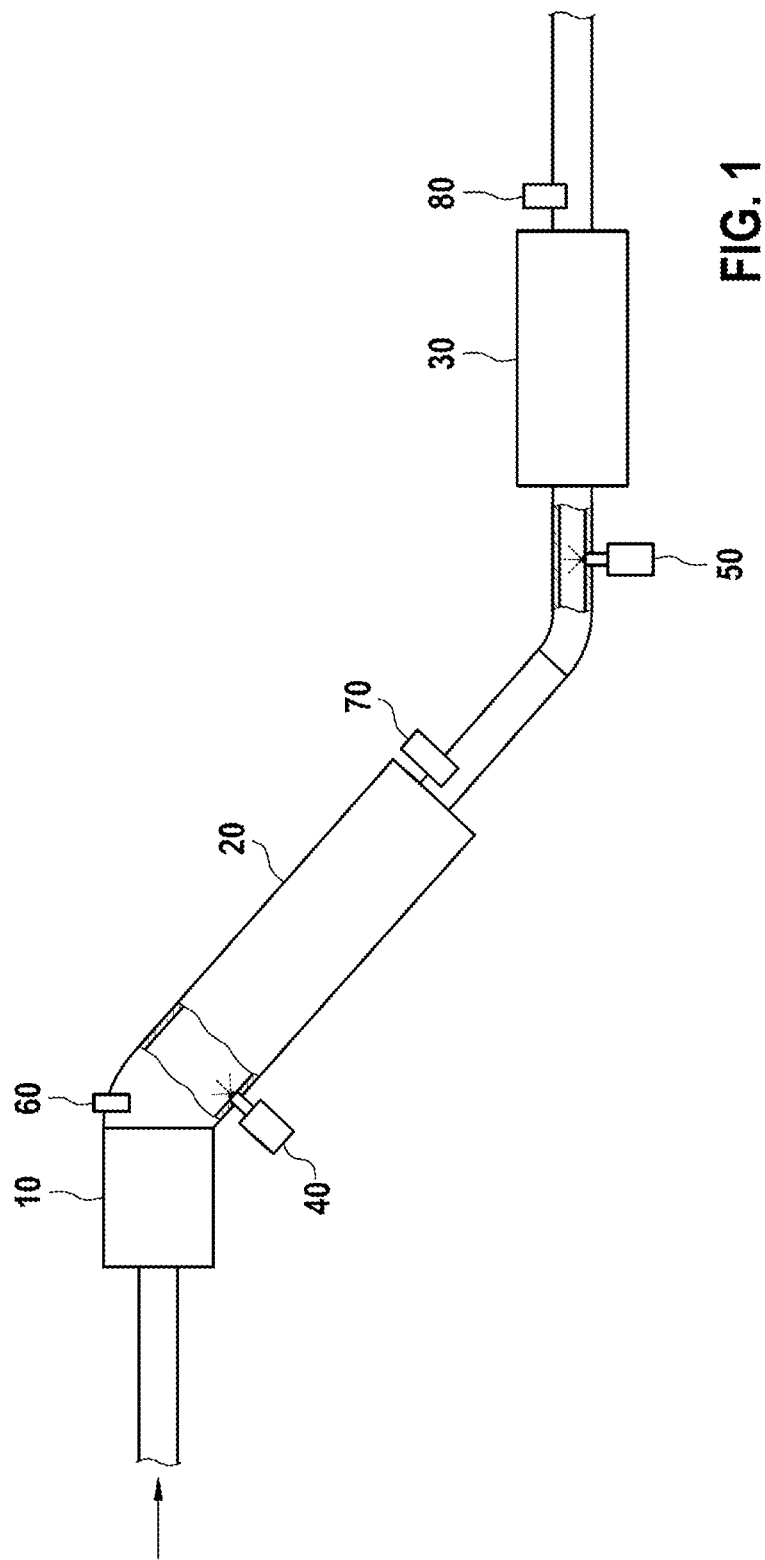
FIG. 1 shows an exemplary system in which embodiments of the invention can be used.

FIG. 1 shows a system in which embodiments of the present invention can be used. The figure shows a section of an exhaust-gas tract with various elements of an exhaust-gas aftertreatment system. Here, one or more SCR catalytic converters may be provided in series in the exhaust-gas tract.

In the present example, the exhaust gas is firstly introduced into an oxidation catalytic converter 10 and is conducted from there to a first SCR catalytic converter 20, which may for example be in the form of an SCR catalytic converter combined with a particle filter (SCRF, SCR on filter). Downstream, the exhaust gas is subsequently conducted further through a second SCR catalytic converter 30. Here, the exhaust-gas aftertreatment system may also comprise further exhaust-gas aftertreatment elements such as other catalytic converters, filters or others, which are not expressly described here.

Arranged upstream of each SCR catalytic converter 20, 30 is at least one dosing element 40, 50, such as for example an injection valve, which permits an injection of reducing agent such as for example a urea-water solution. The reducing agent injection may optionally also take place at a location other than that shown here.

Furthermore, sensors 60, 70 and 80 are used in order to be able to determine the present values of the $NO_x$ emissions and/or of the $NH_3$ slippage and in order to be able to control the catalytic converter correspondingly. Here, use may be made in particular of multi-gas sensors which are capable of outputting separate signals for $NO_x$ and $NH_3$. In this case, it is sufficient for in each case one multi-gas sensor 70 and 80, which measures and separately outputs both signals, to be arranged downstream of the respective catalytic converter 20 and 30. Alternatively, it is however also possible for two individual sensors for $NO_x$ and $NH_3$ to be provided downstream of each of the catalytic converters. It must merely be possible for separate signals to be obtained or at least indirectly derivable therefrom, that is to say a $NO_x$ signal without $NH_3$ component resulting from cross-sensitivities and a separate $NH_3$ signal. These embodiments may likewise be combined, such that measurement is performed by means of one multi-gas sensor downstream of one of the catalytic converters and by means of two separate sensors downstream of the other catalytic converter. The signals of the sensors are read out by a control unit which is responsible for the control of the catalytic converter. This may be a dedicated catalytic converter controller or else a central control unit of the vehicle. In the control unit, it is also possible for values of these sensors and other parameters, specifications, calculation models and threshold values to be stored and/or updated.

An aging factor for an SCR catalytic converter may for example be expressed as a value between 0 and 1, wherein an aging factor of 1 may be selected as a maximum value for a new catalytic converter, and the value is reduced with progressive aging of the catalytic converter. A further predefined threshold value below 1, or the value 0, may then indicate that the catalytic converter has aged to a maximum extent (BPU, "best performing unacceptable") and must be exchanged because it no longer attains the respectively desired specifications for exhaust-gas purification. By means of a continuous adaptation of the aging factor, a model can thus be optimally adapted to the present state of the SCR catalytic converter, that is to say for example to long-term changes such as temperature-induced damage, but also to short-term changes, such as poisoning by unburned hydrocarbons and associated reduced catalytic activity.

Figure 2:
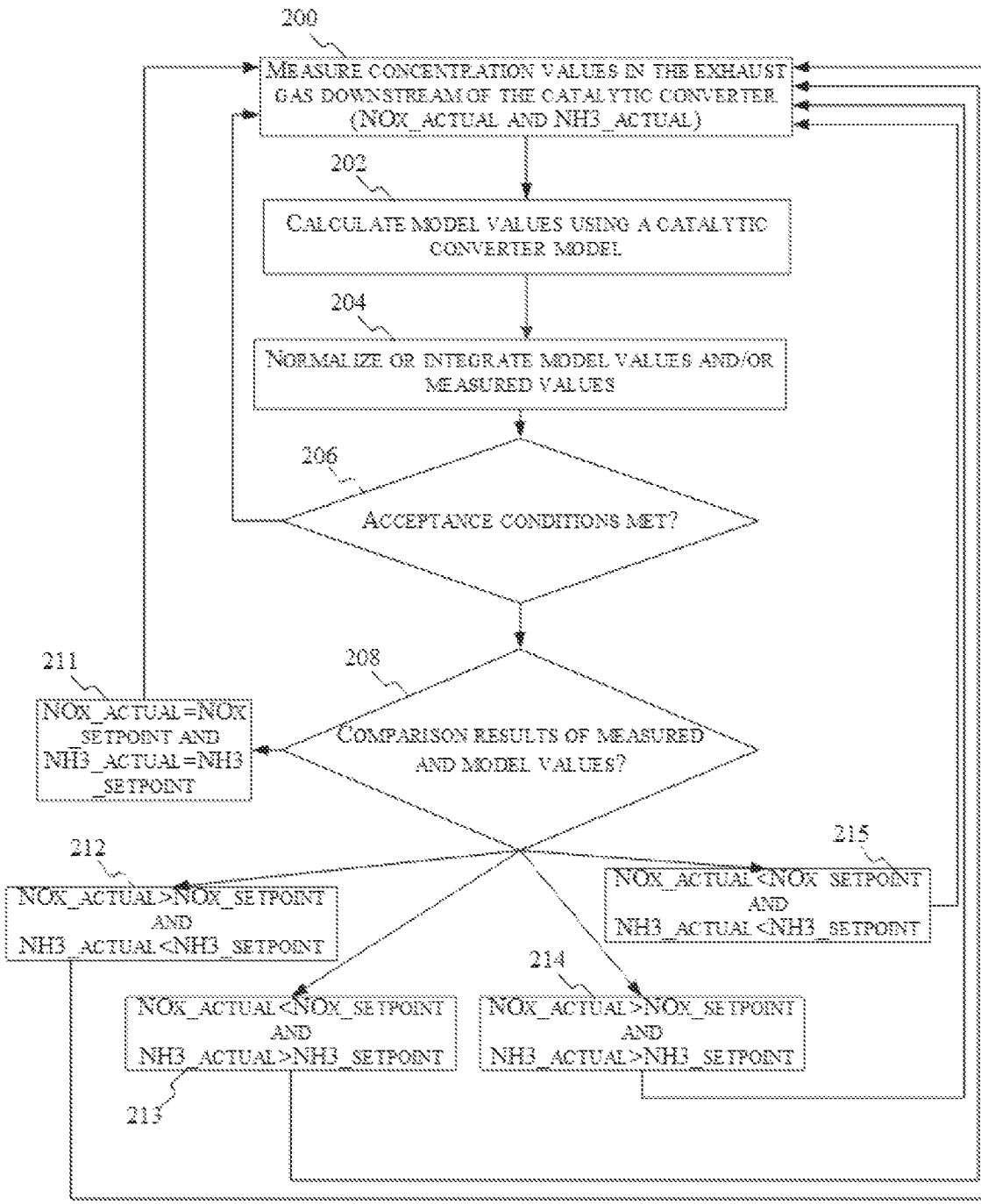
FIG. 2 shows an exemplary method sequence of an embodiment.

FIG. 2 shows an exemplary method sequence according to a preferred embodiment of the invention. Here, a method will be described below for one of the catalytic converters, which method can then be applied separately to each SCR catalytic converter in the system.

For improved control of the catalytic converter system and of the injection quantities of the reducing agent that are introduced by means of the dosing elements 40 and 50, it is then possible in step 200 for the present content of $NO_x$ and $NH_3$ downstream of each catalytic converter 20, 30 to be separately measured by means of suitable sensors 70 and 80, in particular downstream of the catalytic converter. For the same values, it is possible, in step 202, for model values to be calculated by means of a catalytic converter model in a control unit, which model values correspond to an expected setpoint value. Here, it is self-evidently possible in the real sequence for the calculation 202 of the modeled values and the measurement 200 of the actual values to also be performed in the reverse sequence or in parallel with one another.

In step 204, the model values and/or the measured values may optionally be subjected to further steps, such as for example normalization or integration, which will be described in more detail below in conjunction with the further examples.

Optionally, at this point in step 206, or at some other point in the method sequence, acceptance conditions may be checked which indicate whether the present measured values are meaningful, and should be used, for an evaluation and subsequent change of dosing quantity and/or aging factor. If not, the values may be discarded and measured again. The check of the acceptance conditions may be performed at any point in time in the method, that is to say directly after detection of the sensor values or else only for example after the calculation of the differences, such that difference values without acceptance are not taken into consideration.

For example, it may be checked whether the sensors used are operational. Likewise, the catalytic converter temperature may be taken into consideration, such that comparison values are utilized for the adaptation of the aging factor only if the catalytic converters are in a temperature range which is favorable for the evaluation. For this purpose, a lower and/or an upper temperature threshold value may be defined. For example, in an SCRF, it is preferable if the regeneration phases of the particle filter, during which very high temperatures prevail, are not taken into consideration in the evaluation, such that a temperature of approximately 500° C. may be predefined as an upper threshold. Likewise, the phase after a cold start, in which the catalytic converter has not yet reached its suitable operating temperature, may be excluded from the evaluation by means of a lower threshold of for example 230° C. It is self-evident that these temperature values are stated merely as examples and are dependent inter alia on the operating conditions of the respective catalytic converter.

Furthermore, the untreated $NO_x$ mass flow may be checked with a threshold value for the acceptance in order to obtain reliable values. In the case of a mass flow which is too low, offset errors of the sensors may arise. It is also possible for the present driving conditions as a whole to be taken into consideration, for example through definition of a further factor which indicates the extent to which the driving conditions are dynamic or steady-state. Steady-state conditions may be advantageous for the acceptance, because the result is not falsified by gas propagation times.

All of these conditions and checks may be used individually or in any combination for the acceptance of the measured values and/or of the evaluation results. Further acceptance conditions not mentioned here may likewise be utilized.

When acceptance has been performed, the measured values may then, in step 208, be compared with associated model values. It is then for example possible for the dosing quantity of the reducing agent to be adapted in the next step in a manner dependent on the result of the comparison.

From the comparison 208, it is then however also possible, aside from the adaptation of the dosing quantity, for conclusions to be drawn regarding the degree to which the presently used aging factor of the model is suitable. If it is identified that the present actual aging of the catalytic converter is greater than the modeled aging that is used, the aging factor in the model can then be correspondingly adapted. In this way, the system can continuously and automatically learn the present aging factor and minimize the deviations of the values in relation to the model values. Only the boundary conditions are predefined.

For a catalytic converter, it is thus the case, in one embodiment, that the actual values of the $NH_3$ slippage and of the $NO_x$ emissions downstream of the catalytic converter are measured continuously or at predefined intervals as a mass flow or as a concentration (for example in ppm, parts per million), such that, as a result, a value $NO_x$ actual and a value $NH_3$ actual is available for every measurement point. Likewise, a model value for these two parameters can be calculated using a present model of the catalytic converter. The aging factor of the catalytic converter is used as an input into the model. One thus obtains modeled setpoint values $NH_3$-setpoint and $NO_x$-setpoint for the ammonia slippage and the $NO_x$ emissions, which can then be compared with the measured actual values.

In a manner dependent on the result of the comparison, it is then possible for various conclusions to be drawn with regard to the aging and the present fill level of the catalytic converter, and, in the next step, for the dosing quantity and/or the model to be correspondingly adapted.

In one embodiment, it is possible here to distinguish between five cases:

In case 1 (step 211), the measured actual values substantially correspond to the setpoint values, that is to say $$NO_x\_actual=NO_x\_setpoint \text{ and }$$
$$NH_3\_actual=NH_3\_setpoint \qquad (1).$$

This may mean that aging and $NH_3$ fill level of the catalytic converter correspond to the present model, and no adaptation is necessary. Here, it is optionally possible for tolerances or threshold values to be predefined within which, for this first case, two values can be regarded as being substantially equal in order to avoid excessively frequent adaptations. Such a threshold value may however also first be utilized in a subsequent step, for example in the context of an acceptance logic for the results of the value comparison.

In case 2 (step 212), the actual value for $NO_x$ is higher than the threshold value for $NO_x$, whereas the actual value for $NH_3$ is lower than the setpoint value, $$NO_x\_actual>NO_x\_setpoint \text{ and }$$
$$NH_3\_actual<NH_3\_setpoint \qquad (2).$$

This thus means that the emissions downstream of the catalytic converter are higher than expected and the slippage is lower, such that it can be inferred that the catalytic converter has a fill level which is too low. Correspondingly, the injection of $NH_3$ or reducing agent (urea-water solution) can consequently be increased by a predefined value. This may be a fixedly defined added quantity, or the added quantity may be determined in a manner dependent on particular parameters, for example in a manner dependent on the difference between setpoint and actual values.

Optionally, for this purpose, a suitable closed-loop controller may be provided which, on the basis of a correspondingly implemented closed control loop, performs adjustment to the setpoint value by closed-loop control and variably sets the associated added quantity as a manipulated variable. It is possible here to stipulate that the closed-loop controller is utilized only if the value comparison in the first step demands an adaptation of the dosing quantity as a result. It would likewise be possible for additional quantities to be predefined on the basis of a characteristic map for different operating conditions.

In a further case 3 (step 213), the actual value for $NO_x$ is lower than the setpoint value whereas the actual value for $NH_3$ is higher than the setpoint value, $$NO_x\_actual<NO_x\_setpoint \text{ and }$$
$$NH_3\_actual>NH_3\_setpoint \qquad (3)$$

such that the $NO_x$ emissions downstream of the catalytic converter are thus lower than modeled and the slippage is higher than modeled. This result indicates that the catalytic converter fill level is too high, such that the dosing quantity can consequently be reduced by a certain value. As before in the case of the increase of the dosing quantity, this may be a fixedly predefined subtracted quantity, or a subtracted quantity calculated on the basis of the setpoint and actual values or determined by means of a closed-loop controller.

In case 4 (step 214), it is again the situation, as in case 1, that the $NO_x$ actual value is higher than the $NO_x$ setpoint value, whereas it is however the case at the same time that the actual value for the $NH_3$ slippage is also higher than the setpoint value, that is to say $$NO_x\_actual>NO_x\_setpoint \text{ and }$$
$$NH_3\_actual>NH_3\_setpoint \qquad (4).$$

This corresponds to a situation in which both measured values are poorer than has been predicted on the basis of the present model. It can be inferred from this that the catalytic converter exhibits greater aging than has been taken into consideration in this modeling that is used. The aging factor in the model can consequently be reduced.

Finally, in case 5 (step 215), the actual values both for $NO_x$ and for $NH_3$ are lower and thus better than the setpoint values, $$NO_x\_actual<NO_x\_setpoint \text{ and }$$
$$NH_3\_actual<NH_3\_setpoint \qquad \text{(case 5)},$$

that is to say the model has predicted altogether poorer catalytic converter behavior than corresponds to the measurement. This means that it can be assumed that the catalytic converter has aged to a lesser extent than has been taken into consideration in the present modeling. The aging factor in the model can consequently be correspondingly increased.

Here, the extent of the change of the aging factor may be determined in a variety of ways, for example through the use of a suitable closed-loop control element such as for example a closed-loop I controller. Alternatively, the step width of the increase or reduction of the aging factor in cases 4 and 5 may be fixedly predefined such that, for example in the case of the conditions of the respective comparison situations being met, the aging factor is increased or reduced by a value of 0.01 or some other suitable value, or a variable change of the aging factor in a manner dependent on particular conditions or parameters may be provided. Here, existing data which take into consideration for example the normal course of aging of the catalytic converter used may also be input.

For all illustrated cases 1 to 5, it is also possible for tolerance thresholds to also be taken into consideration by way of suitable threshold values. Here, the tolerance thresholds may be of equal or different magnitude for each comparison case. Correspondingly, the adapted comparison conditions for the ascertainment of deviations may then be in each case as follows:

$$NH_3\_actual-NH_3\_setpoint \leq C_1 \text{ or } NH_3\_actual-NH_3\_setpoint \geq C_3,$$

and $$NO_x\_actual-NO_x\_setpoint \leq C_2 \quad \text{or} \quad NO_x\_actual-NO_x\_setpoint \geq C_4$$

where $C_1$, $C_2$ may be (first and second) threshold values or constants $\leq 0$, and $C_3$, $C_4$ may be (third and fourth) threshold values $\geq 0$. Results within these ranges delimited by the threshold values may then be regarded as substantially equal (case 1). It is thus possible, for example, for constant adaptations and changes of dosing quantities or aging factors to be prevented.

If the respective thresholds are overshot, and if acceptance conditions are met, the corresponding change of the aging factor is performed. As has already been described, it is alternatively possible for the check of the acceptance conditions to be performed only after the parameter comparison and the classification into the stated cases.

Figure 3:
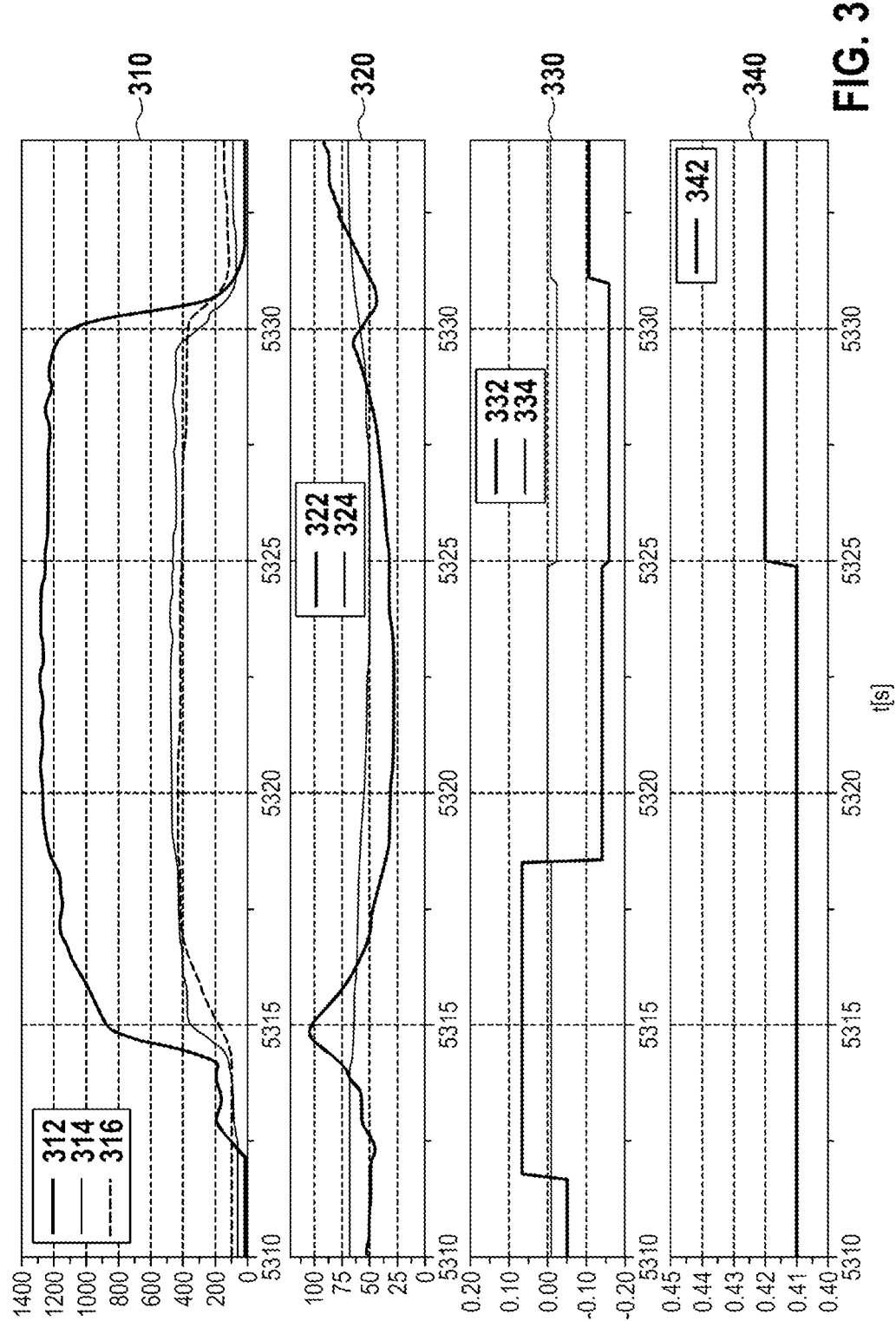
FIG. 3 shows exemplary measured values according to an embodiment for a case in which the present aging is less than the modeled aging.

FIGS. 3 and 4 show various exemplary measurement curves and parameters which have been measured in a motor vehicle with two SCR catalytic converters 20, 30 and two dosing valves 40, 50 for the injection of the urea solution, wherein one of the catalytic converters 20 is an SCRF, that is to say an SCR catalytic converter combined with a particle filter. For the measurement, a $NO_x$ sensor 60 upstream of the first catalytic converter and in each case one multi-gas sensor 70, 80 downstream of the first 20 and the second 30 catalytic converter have been used. The measurements relate here by way of example to the first catalytic converter 20, that is to say the SCRF catalytic converter, and thus the sensor signals of the sensors 60 and 70.

FIG. 3 shows an example of various measurement and parameter values for an SCR(F) catalytic converter in case 5, that is to say for a catalytic converter whose behavior during the measurement is better than has been predicted by the model on the basis of aging and which meets the condition (5) as presented above.

In the first graph 310, in this regard, the untreated $NO_x$ values 312, that is to say the $NO_x$ emissions from the engine upstream of the catalytic converter, and the $NO_x$ actual values 314 from the sensor signal and setpoint values 316 from the model for $NO_x$ downstream of the catalytic converter are plotted in ppm over the course of time for a period of time of approximately 25 seconds. After an abrupt increase, it is possible to see relatively continuously high untreated $NO_x$ emissions 312, which are greatly reduced in a desired manner by means of the catalytic converter. The setpoint and actual values 314 and 316 for $NO_x$ lie close together but have a considerable difference in particular in the region of the increase and decrease of the emissions, such that the model predicts higher $NO_x$ emissions than those measured by the sensor signal.

The second graph 320 shows the setpoint values 322 and actual values 324 for $NH_3$ in ppm downstream of the SCRF catalytic converter over the same time range. Again, the actual values have been obtained from the sensor signal, whereas the setpoint values reflect the modeled values. In this case, too, it is possible to see very considerable differences between the actual and setpoint values.

Finally, in the third graph 330, the comparison values or differences of setpoint value and actual value for $NO_x$, curve 332, and $NH_3$, curve 334, downstream of the catalytic converter are plotted. It is to be noted here that this comparison, or the difference between actual and setpoint values in general, can also be calculated in different ways for all of the abovementioned five valuation cases, and preferably comprises not only an instantaneous difference calculation. For example, in the present case from FIG. 3, the deviations of the mass flows, predefined in mg/s, of $NO_x$ and $NH_3$ have each been integrated and then provided in normalized form in mg/km, that is to say in relation to the traveling distance covered. The traveling distance may in this case be used directly or for example integrated from the traveling speed. Alternatively, the sensor signals and model values may be expressed in the form of concentrations, and the differences thereof evaluated, which can then in turn be integrated. Instead of relating the comparison to the traveling distance covered, it is alternatively also possible for a particular $NO_x$ untreated emissions quantity to be used as a predefined reference variable for the integration.

The fourth graph 340 in FIG. 3 finally shows the aging factor 342, which remains constant or is adapted in a manner dependent on the comparison results and the checked acceptance conditions. As already described, the aging factor is in this case expressed as a dimensionless factor between 0 and 1, though could also be implemented in some other way. On the basis of the deviations between setpoint and actual value shown in the third graph 330, the aging factor 342 is finally increased by one step from 0.41 to 0.42, because the aging is less than assumed.

Here, aside from the described comparisons of the $NO_x$/$NH_3$ values, it is optionally also possible for further triggers for an adaptation of the aging factor to be provided, which are not shown or described here.

FIG. 4 shows a further exemplary measurement, and the associated calculation and comparison values, in an SCRF catalytic converter in case 4, that is to say a case in which the measured actual values both for the $NH_3$ slippage and for the nitrogen oxides downstream of the catalytic converter are higher and thus poorer than the modeled setpoint values.

Here, the four graphs are arranged as in FIG. 3 and show the course of the model values and measured values over a range of approximately 55 seconds. Again, the first graph 410 shows the nitrogen oxide values upstream and downstream of the catalytic converter, that is to say the untreated $NO_x$ value 412, the $NO_x$ actual value 414 downstream of the catalytic converter, and also the $NO_x$ setpoint value 416 downstream of the catalytic converter, in each case in ppm. The untreated emissions fluctuate at a high level before falling toward the end. The second graph 420 shows the setpoint value 422 and the actual value 424 for $NH_3$ in ppm, whereas the third graph 430 again illustrates the integrated deviations of the setpoint and actual values for $NO_x$ (curve 432) and $NH_3$ (434). As a result, on the basis of the measurements and the comparison conditions that are met, the aging factor 442 is, in graph 440, reduced by one step from 0.44 to 0.43 after the first measurement points, because the deviations show that the actual values are poorer than presently predicted by the model.

Aside from the described model adaptation for the dosing, the aging factor that is kept up-to-date in the described manner may also be used for further purposes in the controller. For example, on this basis, the general data version with regard to the catalytic converter can be adapted, because an aged system can for example generate less $NO_x$ conversion or, for the same conversion, generates more $NH_3$ slippage. Likewise, the $NH_3$ fill levels can be adapted to the correct aging.

In general, the embodiments of the above method may be used in any exhaust-gas aftertreatment system of internal combustion engines with an SCR catalytic converter or in an equivalent system, for example in gasoline or diesel engines. The control method may also be implemented as a software module which can be integrated into new or existing control units for a catalytic converter or for a vehicle, as long as the controller can receive the sensor signals. The stated and presented numerical values for acceptance conditions and comparison thresholds are to be understood merely as examples, and may be replaced by suitable other values in every system. Likewise, the consideration of the aging in the model may be implemented in a manner other than that described here, such that the adaptation steps that follow from the comparison cases also correspondingly change, wherein the basic method sequence as presented above may nevertheless be used.

The invention claimed is:

1. A method for controlling an SCR catalytic converter, comprising
    detecting concentration values in the exhaust gas downstream of the catalytic converter, wherein at least one concentration value for $NH_3$ and one concentration value for $NO_x$ is detected;
    calculating modeled concentration values for $NH_3$ and $NO_x$ downstream of the catalytic converter on the basis of a catalytic converter model, wherein the model comprises an aging parameter which at least partially describes aging of the modeled catalytic converter;
    comparing the detected concentration values with the modeled concentration values; and, in a manner dependent on the result of the comparison, changing the aging parameter of the model, changing a predefined dosing quantity for a reducing agent in the SCR catalytic converter, or both, wherein the predefined dosing quantity for a reducing agent is reduced if the comparison of the concentration values yields that a deviation between the detected concentration values and the modeled concentration values for $NO_x$ is lower than a predefined first threshold value and the deviation between the detected concentration values and the modeled concentration values for $NH_3$ is higher than a predefined second threshold value, and wherein the predefined dosing quantity for a reducing agent is increased if the comparison of the concentration values yields that the deviation between the detected concentration values and the modeled concentration values for $NO_x$ is higher than a predefined third threshold value and the deviation between the detected concentration values and the modeled concentration values for $NH_3$ is lower than a predefined fourth threshold value.

2. The method according to claim 1, wherein the aging parameter is changed if the comparison of the concentration values yields that the deviation between the detected concentration values and the modeled concentration values is both lower than a predefined first threshold value for $NH_3$ and lower than a predefined second threshold value for $NO_x$, wherein the first and the second threshold value are lower than or equal to zero, or if the comparison of the concentration values yields that the deviation between the detected concentration values and the modeled concentration values is both higher than a predefined third threshold value for $NH_3$ and higher than a predefined fourth threshold value for $NO_x$, wherein the third and the fourth threshold value are higher than or equal to zero.

3. The method according to claim 1, wherein the method further comprises:
checking at least one acceptance condition for detected concentration values, and
discarding detected concentration values if at least one acceptance condition for said detected concentration values is not met.

4. The method according to claim 3, wherein the at least one acceptance condition comprises at least one of the following: a lower and/or upper threshold value for the catalytic converter temperature, a status of a sensor for detecting concentration values, a threshold parameter for describing driving dynamics, a threshold value for a mass flow of the exhaust gas upstream of the catalytic converter.

5. The method according to claim 1, wherein, for the aging factor, a maximum value is predefined which corresponds to a fully functional catalytic converter, and a minimum value, which corresponds to a catalytic converter which is no longer adequately functional.

6. The method according to claim 1, wherein the comparison of detected and modeled concentration values comprises integrating the concentration values over a predefined period of time and calculating a difference between the modeled and the detected integrated concentration values.

7. The method according to claim 6, wherein the predefined period of time is determined in a manner dependent on a defined traveling distance, or wherein the predefined time period is determined in a manner dependent on a defined reference quantity of untreated $NO_x$ emissions through the internal combustion engine.

8. The method according to claim 1, further comprising: setting or predefining a step size by which the aging parameter of the model is increased or reduced.

9. The method according to claim 1, wherein the concentration values in the exhaust gas downstream of the catalytic converter are detected by means of a multi-gas sensor configured to output separate signals for $NH_3$ and $NO_x$.

10. A processing unit which is configured to
detect, via one or more sensors, concentration values in the exhaust gas downstream of a catalytic converter, wherein at least one concentration value for $NH_3$ and one concentration value for $NO_x$ is detected;
calculate modeled concentration values for $NH_3$ and $NO_x$ downstream of the catalytic converter on the basis of a catalytic converter model, wherein the model comprises an aging parameter which at least partially describes aging of the modeled catalytic converter;
compare the detected concentration values with the modeled concentration values; and,
in a manner dependent on the result of the comparison, change the aging parameter of the model, change a predefined dosing quantity for a reducing agent in the SCR catalytic converter, or both,
wherein the predefined dosing quantity for a reducing agent is reduced if the comparison of the concentration values yields that a deviation between the detected concentration values and the modeled concentration values for $NO_x$ is lower than a predefined first threshold value and the deviation between the detected concentration values and the modeled concentration values for $NH_3$ is higher than a predefined second threshold value, and wherein the predefined dosing quantity for a reducing agent is increased if the comparison of the concentration values yields that the deviation between the detected concentration values and the modeled concentration values for $NO_x$ is higher than a predefined third threshold value and the deviation between the detected concentration values and the modeled concentration values for $NH_3$ is lower than a predefined fourth threshold value.

11. A non-transitory, machine-readable memory medium containing instructions that when executed by a computer cause the computer to
detect, via one or more sensors, concentration values in the exhaust gas downstream of a catalytic converter, wherein at least one concentration value for $NH_3$ and one concentration value for $NO_x$ is detected;
calculate modeled concentration values for $NH_3$ and $NO_x$ downstream of the catalytic converter on the basis of a catalytic converter model, wherein the model comprises an aging parameter which at least partially describes aging of the modeled catalytic converter;
compare the detected concentration values with the modeled concentration values; and,
in a manner dependent on the result of the comparison, change the aging parameter of the model, change a predefined dosing quantity for a reducing agent in the SCR catalytic converter, or both,
wherein the predefined dosing quantity for a reducing agent is reduced if the comparison of the concentration values yields that a deviation between the detected concentration values and the modeled concentration values for $NO_x$ is lower than a predefined first threshold value and the deviation between the detected concentration values and the modeled concentration values for $NH_3$ is higher than a predefined second threshold value, and wherein the predefined dosing quantity for a reducing agent is increased if the comparison of the concentration values yields that the deviation between the detected concentration values and the modeled concentration values for $NO_x$ is higher than a predefined third threshold value and the deviation between the detected concentration values and the modeled concentration values for $NH_3$ is lower than a predefined fourth threshold value.

* * * * *